Figure 1:
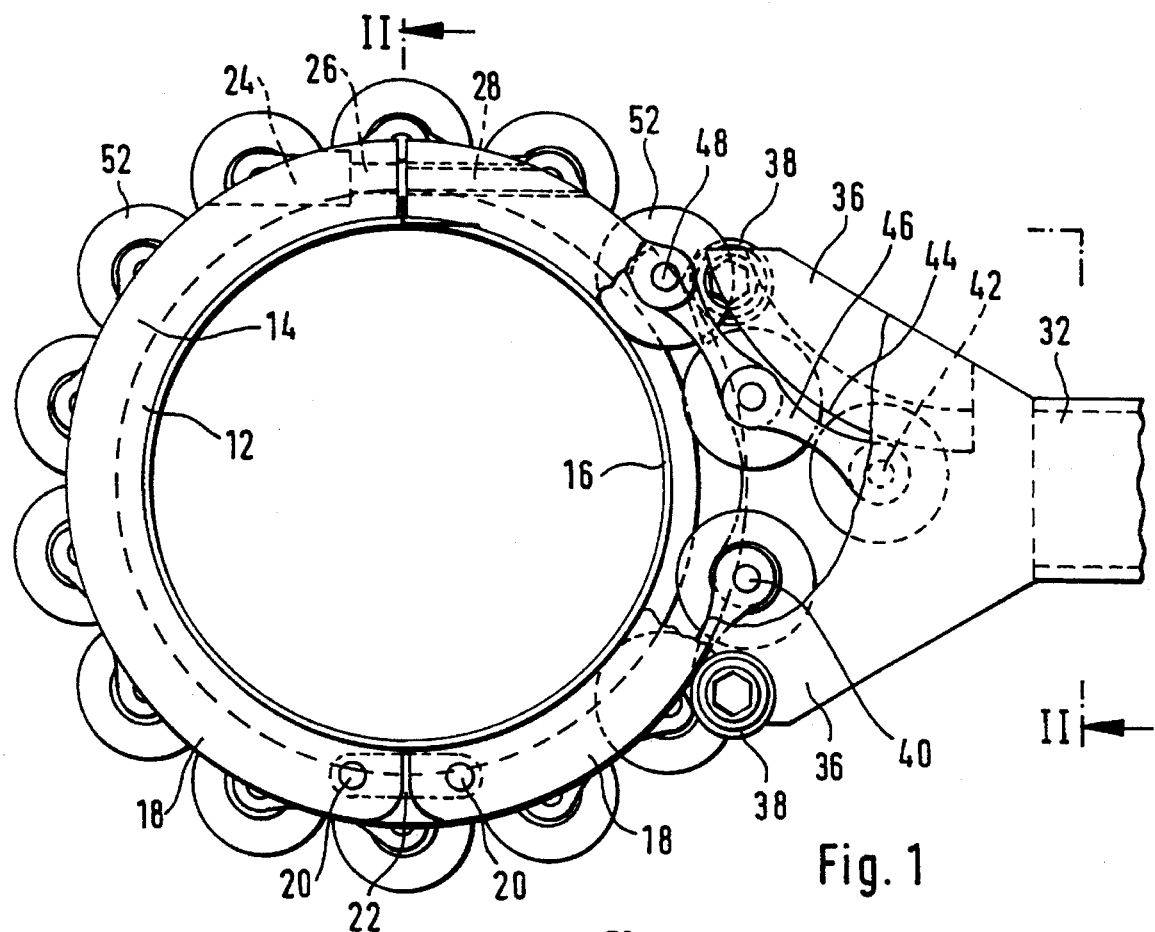

United States Patent
Weisshaar

Patent Number: 5,461,955
Date of Patent: Oct. 31, 1995

[54] DEVICE FOR CUTTING PIPE

[76] Inventor: Erhard Weisshaar, Erlenweg 2, D - 7712 Blumberg 3, Germany

[21] Appl. No.: 976,202

[22] Filed: Nov. 16, 1992

[30] Foreign Application Priority Data

Nov. 16, 1991 [DE] Germany ............. 41 37 808.3

[51] Int. Cl.⁶ ............. B26D 3/16; B23D 21/06
[52] U.S. Cl. ............. 83/54; 83/880; 30/96; 30/100
[58] Field of Search ............. 30/94, 95, 96, 30/98, 99, 100, 101; 83/54, 880

[56] References Cited

U.S. PATENT DOCUMENTS

| | | | |
|---|---|---|---|
| 1,428,712 | 9/1922 | Sanders et al. | |
| 1,737,889 | 12/1929 | McKnight et al. | 30/99 |
| 2,639,501 | 5/1953 | Harding | 30/100 |
| 3,430,830 | 3/1969 | Coblitz | 30/100 |
| 4,063,355 | 12/1977 | Netzel | 30/101 |
| 4,296,551 | 10/1981 | Boyd . | |
| 4,402,136 | 9/1983 | Rast | 30/101 |
| 4,763,413 | 8/1988 | Rothenberg | 30/95 |

FOREIGN PATENT DOCUMENTS

| | | |
|---|---|---|
| 681040 | 9/1939 | Germany . |
| 2743151 | 4/1979 | Germany . |
| 7904781 | 7/1979 | Germany . |
| 2810910 | 10/1979 | Germany . |
| 9011516.3 | 11/1990 | Germany . |

*Primary Examiner*—Rinaldi I. Rada
*Attorney, Agent, or Firm*—Dominik & Stein

[57] ABSTRACT

A device for cutting pipe comprising two sleeves, which sleeves are securely tensionable about a pipe and adjacent to each other. An axial cleft remains exposed between the two sleeves, in which lies the cutting line. A chain type pipe cutter runs upon the sleeves, the cutting disks of the pipe cutter engaging the pipe between the sleeves and severing the pipe. The rollers of the cutting disks are supported by the sleeves, whereby the cutting depth is limited. Further, support bearing rollers support the chain type pipe cutter upon the sleeves. The device is economical and makes possible the cutting of pipes even of minimal form stability without deforming the pipes.

10 Claims, 1 Drawing Sheet

U.S. Patent  Oct. 31, 1995  5,461,955

DEVICE FOR CUTTING PIPE

The invention concerns a device for the cutting of pipes.

For the cutting of pipes there have been employed pipe cutters, which comprise fixed blades or rotatingly mounted blade disks. The essentially pin point application of the cutting force with these pipe cutters leads, in the case of thin walled pipes, to a deformation. This problem is most likely to occur in plastic pipes and thin walled steel pipes.

In order to alleviate such a deformation of the pipe when using such a device it has been proposed, as shown for example in DE 27 43 151 A1 and DE 79 04 781 U1, to tighten a hose clamp or sleeve around the pipe, which tightly grips the pipe. A cutting tool is mounted over the sleeve and can, guided over the sleeve, be moved around the pipe, so that the cutting line penetrates axially next to the sleeve.

The sleeve securely envelopes the pipe on one side of the line to be cut, so that a deformation at the cut line under the pressure of the cutting tool is at first not possible. However, once the pipe is severed through more than one half of it's circumference, the partially severed segment of the pipe can be moved independently of the securely held piece, so that a deformation can occur in the not yet severed segment of the pipe wall, which carries over also into the segment of pipe gripped by the sleeve. With thin walled pipes of little form stability there can thus result unsatisfactory cut edges, despite the secure clamping of the pipe within a sleeve.

For each pipe diameter there is necessitated a sleeve of corresponding diameter. Since the cutting tool must be rotatingly guided about the sleeve, it thus becomes necessary to provide a cutting tool tailored to fit for each particular sleeve. This is disadvantageous, since the fitter must purchase an entire set of devices corresponding to the various sizes of pipe and must carry this set about with him for fitting work.

Further there are known the chain pipe cutters as disclosed in, e.g., in DE 28 10 910 C2, which comprise an articulated link chain which can be tensioned about the pipe to be cut, upon the linking pins of which blade disks are provided, which cut through the pipe. The chain pipe cutters have the advantage that the same tool can be applied to pipes of different pipe diameter, whereby it is only necessary to vary the length of the chain utilized in the tool. It is also the case with these chain pipe cutters that the cutting force is applied in a pin point manner, so that also the above mentioned problems occur.

From DE 90 11 516 U1 it is known, for the severing of a corrugated hose, to fasten about this hose two pipe like sleeves. The sleeves respectively grip with an inner flange the wave part of the hose and are thereby respectively so positioned that they form a guiding cleft for a separation tool, such as a saw, which is provided on a wave crest. Thereby it is insured that the hose is separated in the vicinity of a wave crest. Burrs, which can be formed on the severing line, therefore do not project into the internal cross section of the corrugated pipe, which is defined by means of the wave troughs. The sleeves lie secured only in an axial direction upon the corrugated hose and define an exact guide for the separation tool. The sleeves do not prevent a deformation of the hose under the pressure of the severing tool.

The object of the present invention is to provide a device for cutting of pipes, which makes possible the cutting of pipes, including thin walled pipes of minimal form stability, without deformation, and which is economical.

This object is solved in accordance with the present invention by means of a device for the cutting of pipe, with a cutting tool, and with a first sleeve which is fastenable tensionally to the pipe to be cut adjacent to the line to be cut, and with a second sleeve which is fastenable to the pipe, which clamps the pipe in an axial spatial separation which leaves exposed the line to be cut, wherein the cutting tool is a chain type pipe cutter with an about the pipe tensionable link chain having mounted therein blade disks.

Advantageous working examples of the invention are seen in the dependent claims.

In accordance with the present invention the pipe is enclosed on each side of the cutting line respectively with a sleeve which is then tensionally secured. Even at the end of the cutting process, when the two pipe sections remain connected by only a small section of wall, a deformation is not possible since the cut edges of both pipe segments are respectively maintained in exact circular form by means of the two sleeves. A movement of the pipe segments with respect to each other in the vicinity of the cut line is also not possible, since the tensioned link chain of the chain pipe cutter is tensioned about the pipe in the area of the cutting line and holds the two pipe segments even when the segments are almost completely or completely separated from each other.

For pipes of various cross sections there are employed only the sleeves of the corresponding appropriate cross sections. Since the chain pipe cutter is not connected to the sleeves, there can however always be employed the same chain pipe cutter, in which case it is understood that a link chain of appropriate length is employed. Since only a single chain pipe cutter is needed for various pipe diameters, the device is economical and for the fitting work only a minimal amount of tools must be carried about.

The sleeves fastened on the pipe on both sides of the cutting line guide the blade disks of the chain pipe cutter precisely upon the cutting line, so that an exact cut can be made and a wandering of the chain pipe cutters or a displacement of the cut line is precluded, even though the chain pipe cutter is not mounted on the sleeves.

Advantageously rollers are provided on the chain link pins of the link chain upon which the cutting disks are mounted, which in certain cases may form a single piece together with the cutting blades. These rollers support themselves upon the sleeves and serve thereby as spacers, which limit the depth of penetration of the cutting disks.

The sleeves can be slid over the pipe to be cut in the form of locked sleeves. This is however generally impractical and in some cases impossible as when the pipe to be cut does not exhibit a free end. The sleeves are thus preferably comprised of two half shells, which can be placed around the pipe.

Preferably the sleeves comprise a cuff shaped provide support to the pipe and a thereto attached flange of greater radial thickness. The flange with the greater wall thickness makes possible the securing of tensioning screws and pivoting hinges for the half shells. Further, the flange with the greater wall strength imparts to the sleeve a good mechanical stability, so that the pipe reinforcing cuff may be constructed of a correspondingly thinner wall thickness. The lesser wall thickness of the cuff shaped to reinforce the pipe is ideally suited for the purpose of allowing the rollers, which serve as spacers, to run over them. As the thickness of the wall of the cuff is reduced, the distance to which the cutting disk must project beyond the space maintaining rollers also becomes reduced.

Even when the sleeves are formed of a cuff for reinforcing the shape of the pipe and a flange, the two respective sleeves may have an identical form. It is merely necessary that they are fastened to the pipe in mirror image relationship to each other. The identical form of the two respective sleeves reduces the costs of production and maintaining a supply thereof.

The chain pipe cutter to be employed can in principal be constructed like the one described in DE 28 10 910 C2. This chain pipe cutter comprises a handle lever with a fork like bifurcated mouthpiece. A link chain is fastened to one end of one of the shanks of the mouth piece, such that the first blade disk of the link chain is harbored in this shank. The other shank serves for the guiding of the free end of the link chain, which is hooked into the handle lever and tensioned. For the operation of the chain pipe cutter one tilts the handle lever so that the one shank of the mouthpiece having the associated blade disk is pressed against the pipe to be cut. The opening width of the mouthpiece must therefore have a suitable relation to the diameter of the pipe. Only with a sufficient mouth width will the blade disk, which is associated with the shank which is pressed against the pipe, upon tilting of the handle lever, impart a sufficient force component tangential to the pipe, so that the link chain with the blade disks is brought into motion around the pipe and the blade disks can effect a pulling cutting. If the breadth of the mouth opening in relation to the diameter of the pipe is too small, so that the angular separation of the last two touching cutting disks which are associated respectively with the two legs is approximately 75° or less, then upon the tilting of the handle lever the cutting disk of the tasked shank of the mouthpiece will impart a force approximately radially to the pipe. The cutting blade is thus only pressed against the pipe wall, there is however no force imparted to cause the link chain to circumscribe the pipe, so that the pipe cutter is not functional. This, the pipe cutter constructed in the essentially conventional manner is suited for only a discrete range of pipe diameters, or as the case may be, for a particular range of diameters of sleeves.

In a preferred embodiment of the invention the chain pipe cutter is thus constructed in such a manner that load bearing support rollers are provided in the shanks of the mouth piece, which support themselves upon the outer circumference of the sleeve upon the tensioning of the link chain. As the handle lever is tilted upon operation of the chain pipe cutter, the supporting force is transmitted over the shank of the mouthpiece and the support rollers to the sleeve, and not over the cutting disks into the pipe wall. The link chain can be so introduced in the mouth piece of the chain pipe cutter that the cutting disks at first penetrate into the wall of the pipe in an essentially tangential running direction of the link chain. Thus the chain pipe cutter having the same mouthpiece can be utilized for a substantially greater range of diameter of pipes or sleeves, without there being a diminution of the essentially pulling cutting effect of the cutting disks and therefore the manner of functioning of the device.

In the following the invention will be further explained with respect to a working example as represented in the figures. There are shown:

FIG. 1—a partially cut out front view of the device and

Figure 2:
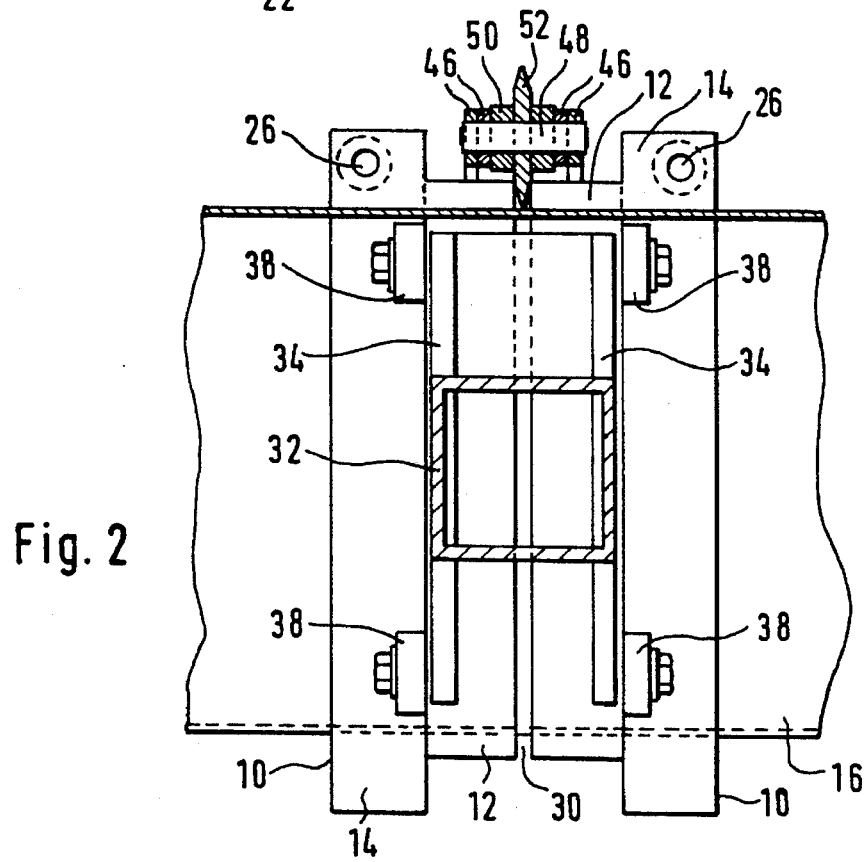

FIG. 2—a cross section through the device along line II—II in FIG. 1.

The device is comprised of two sleeves 10 preferably constructed of a suitable metal. Each sleeve 10 is comprised of a reinforcing cuff 12, with a lesser wall thickness, onto which axially a flange with greater radial wall thickness is united to form a single piece. The cuff 12 and the flange 14 exhibit consistently the same circular internal diameter, which corresponds to the outer diameter of the pipe 16 over which the sleeve is to be locked. As can be seen from FIG. 1, the sleeves 10 are respectively separated along an axial plane into two half shells 18. On one side the two half shells 18 are pivotally hinged in the realm of the flange 14. For this the two half shells 18 are joined to each other respectively with a linking pin or bolt 20 and a connecting plate 22.

Upon the diametrically opposing side there is provided on one half shell 18 (in FIG. 1 on the left half shell) a recess 24 in the outer surface of the flange 14, which is contiguous with a tangentially oriented bore hole 26. In the other half shell 18 (in FIG. 1 in the right half shell) there is provided a tangentially running threaded bore hole 28, which is aligned with the bore hole 26 on the other half shell 18 when the sleeves are closed. In the bore hole 26 there can be inserted a not shown cylinder screw, which can be screwed into the threaded hole 28, whereby the recess 24 receives the head of the screw.

In order to place the sleeve 10 about the pipe 16, the screw is removed, so that the half shells 18 can be swung open by means of the hinged connection and place about the pipe 16. Then the screw is inserted into borehole 26 and screwed into the threaded hole 28, to draw the halfshells against each other and to fasten the sleeves 10 upon pipe 16.

The two sleeves 10 are fastened on pipe 16 in such a manner that their cuffs 12 are oriented facing each other. Between the respective opposing front faces of the cuffs 12 there remains an axial separation 30, in which runs the cutting line, along which the pipe 16 is to be cut.

The chain pipe cutter serves to sever pipe 16. This comprises a handle lever 32, which on its front end forms a fork like bifurcated mouth section. The mouth part is comprised of two parallel jaws 34, which are distanced from each other in an axial direction of the pipe 16. The two jaws 34 extend fork like into shanks 36. On the ends of the thus formed four shanks 36 is respectively mounted, on the outer side of the shank 36, a rotatable support or load bearing roller 38. When the chain pipe cutter is positioned via its mouthpiece to the sleeves 10 which are mounted on pipe 16, the load bearing rollers 38 of each jaw 34 support themselves respectively upon the flange 14 of a sleeve 10.

One of the ends 40 of the link chain of the chain pipe cutter is fastened in the mouthpiece of the chain pipe cutter. The link chain is wrapped around the pipe 16. The free other end 42 of the link chain is directed via a guide 44 in the mouthpiece of the handle lever 32 and hung into a not shown tensioning means, by means of which the link chain which is wrapped about the pipe may be tensioned.

The link chain is comprised of links 46, which are connected to each other by means of link pins or bolts 48. Upon the link pins 48 are respectively rotatably mounted rollers 50. The rollers 50, at the center of their axial length, have a radially extending cutting disk 52, which together with the roller forms a unitary piece.

The link chain of the chain pipe cutter is placed around the sleeves 10, whereupon the cutting disks 52 set in the cleft 30 between the cuffs 12 of the sleeves 10 and the rollers 50 support themselves on both sides of the cleft 30 upon the outer circumference of the cuffs 12. The rolls serve as spacers to delimit the cutting depth of the cutting disks 34, Wherein the cutting depth is calculated based upon the difference between the radial height of the cutting disks 52 and the radial wall thickness of the cuffs 12. The radial height of the cutting disk 52 herein is the difference between the radius of the cutting disk 52 and the roller 50.

When the link chain of the chain pipe cutter is tensioned around the sleeve 10, the pipe 16 can be severed along the cutting line found between the sleeves 10, for which the handle lever 32 of the chain pipe cutter is tilted about the pipe 16. With this tilting of the handle lever 32, the mouthpiece supports itself with the leading bearing rollers 38 upon the flanges 14 of the sleeves 10. The sleeves 10 thereby take up the entire applied force of the chain pipe cutter. No cutting pressure is applied radially to the pipe 16 via the cutting disks 52 in the area of the leading shank 36. The pulling force acting on the opposite end of the link chain can thereby without hindrance pull the link chain about the pipe 16.

Since the pipe 16 is tensioned on each sides of the cutting line respectively over its entire circumference with a sleeve 10, the edges of the pipe 16 will not be deformed during the cutting, despite the essentially point sized application of cutting pressure via the cutting disks 52. Since the link chain tensionally envelopes with the rollers 50 the cuffs 12 of both sleeves 10, even at the end of the cutting process the cut edges of the already severed pipe portion will dislocate with respect to each other, which in the not yet severed wall section could lead to a deformation.

I claim:

1. A method for cutting cylindrical pipe, said method comprising (a) placing securely about said pipe a device for cutting pipe, said device comprising:

a cutting tool, said cutting tool being a chain-type pipe cutter including a link chain and cutting disks rotatably secured to said link chain, and means to tensionably couple said link chain to the pipe to be cut;

a first sleeve having a radially interior surface tensionably fastenable about the pipe at a position adjacent to a circumferential line on the pipe to be cut; and a second sleeve having a radially interior surface tensionably fastenable about the pipe at a position adjacent to a circumferential line on the pipe to be cut to thereby enclose the pipe in a manner leaving exposed the circumferential line with an axial separation between said first sleeve and said second sleeve, said first and second sleeves having radially exterior surfaces for positioning the cutting tool and guiding its movement during the cutting of the pipe wherein said first and said second sleeves are each comprised of (i) an axially interior pipe reinforcing cuff part of lesser wall thickness and (ii) an axially exterior flange part of greater radial wall thickness, and further including guide rollers rotatably secured to the chain links of the pipe cutter coaxially with the cutting disks, said guide rollers having a smaller diameter than the cutting disks and adapted to rest upon the exterior surface of the pipe reinforcing cuff part during cutting of the pipe to serve as spacers to delimit the cutting depth;

(b) tensioning said tensioning means to tensionably secure said link chain and cutting disks to the pipe to be cut; and (c) rotating said cutting tool to cause said cutting disks to cut said cylindrical pipe.

2. A device for cutting cylindrical pipe, said device comprising:

a cutting tool, said cutting tool being a chain-type pipe cutter including a link chain and cutting disks rotatably secured to said link chain, and means to tensionably couple said link chain to the pipe to be cut;

a first sleeve having a radially interior surface tensionably fastenable about the cylindrical pipe at a position adjacent to a circumferential line on the pipe to be cut; and a second sleeve having a radially interior surface tensionably fastenable about the cylindrical pipe at a position adjacent to a circumferential line on the pipe to be cut to thereby enclose the pipe in a manner leaving exposed the circumferential line with an axial separation between said first sleeve and said second sleeve, said first and second sleeves having radially exterior surfaces for positioning the cutting tool and guiding its movement during the cutting of the pipe wherein said first and said second sleeves are each comprised of (a) an axially interior pipe reinforcing cuff part of lesser wall thickness and (b) an axially exterior flange part of greater radial wall thickness, and further including guide rollers rotatably secured to the chain links of the pipe cutter coaxially with the cutting disks, said guide rollers having a smaller diameter than the cutting disks and adapted to rest upon the exterior surface of the pipe reinforcing cuff part during cutting of the pipe to serve as spacers to delimit the cutting depth.

3. A device according to claim 2, wherein said first and said second sleeves have the same form.

4. A device according to claim 2, wherein each sleeve is respectively formed of two half-shells adapted to fit about a pipe, and which are fastenable to each other.

5. A device according to claim 4, wherein said half-shells of each said sleeve have a hinged end and a tensionable end with said hinged ends being flexibly hinged, and with said tensionable ends being disconnectably tensionable, said hinged ends and tensionable ends being diametrically opposed with respect to each said sleeve, and with a hinge at said hinged ends and a screw at said tensionable ends.

6. A device according to claim 5, wherein said first and said second sleeves are each comprised of (a) an axially interior pipe reinforcing cuff part of lesser wall thickness and (b) an axially exterior flange part of greater radial wall thickness, said first and said second sleeves being positionable on a pipe in a mirror image relation to each other, and further including an adjustment screw provided in said flange parts of each said sleeve.

7. A device according to claim 2, wherein said cutting tool further includes a handle lever and a fork-like bifurcated mouth piece, said mouth piece having shanks with rotatably mounted support bearing rollers positionable upon said sleeves during cutting of a pipe.

8. A device according to claim 2, wherein said cutting tool further includes a handle lever and a fork-like bifurcated mouth piece, said mouth piece being comprised of two parallel jaws axially spaced from each other, and wherein each said jaw includes two fork-like diverging shanks, each provided with rotatably mounted support bearing rollers adapted to be supported upon a flange during cutting of a pipe.

9. A device according to claim 2, and further including guide rollers rotatably secured to the chain links of the cutting tool coaxially with said cutting disks, said guide rollers having a smaller diameter than the cutting disks and adapted to rest upon the exterior surface of at least one of said sleeves during cutting of the pipe to serve as spacers to delimit the cutting depth, said cutting tool further including a handle lever and a fork-like bifurcated mouth piece, said mouth piece having shanks each provided with rotatably mounted support bearing rollers adapted to be supported upon a flange during cutting of a pipe.

10. A device for cutting cylindrical pipe, said device comprising:

a cutting tool, said cutting tool being a chain-type pipe cutter including a link chain and cutting disks rotatably secured to said link chain, and means to tensionably couple said link chain to the pipe to be cut;

a first sleeve having a radially interior surface tensionably fastenable about the cylindrical pipe at a position adjacent to a circumferential line on the pipe to be cut; and a second sleeve having a radially interior surface tensionably fastenable about the cylindrical pipe at a position adjacent to a circumferential line on the pipe to be cut to thereby enclose the pipe in a manner leaving exposed the circumferential line with an axial separation between said first sleeve and said second sleeve, said first and second sleeves having radially exterior surfaces for positioning the cutting tool and guiding its movement during the cutting of the pipe, and further including guide rollers rotatably secured to the chain links of the pipe cutter coaxially with the cutting disks, said guide rollers having a smaller diameter than the cutting disks and adapted to rest upon the exterior surface of the sleeves during cutting of the pipe to serve as spacers to delimit.

* * * * *